United States Patent [19]

Marks et al.

[11] Patent Number: 5,845,009
[45] Date of Patent: Dec. 1, 1998

[54] OBJECT TRACKING SYSTEM USING STATISTICAL MODELING AND GEOMETRIC RELATIONSHIP

[75] Inventors: Richard Lee Marks, Pleasanton; John Brian Burns, Palo Alto, both of Calif.

[73] Assignee: Autodesk, Inc., San Rafael, Calif.

[21] Appl. No.: 828,211

[22] Filed: Mar. 21, 1997

[51] Int. Cl.⁶ ............................... G06K 9/52; G06K 9/46
[52] U.S. Cl. ..................... 382/228; 382/165; 382/170; 382/203; 348/169
[58] Field of Search ........................... 382/115, 118, 382/128, 159, 160, 162, 165, 168, 170, 181, 190, 192, 194, 199, 203, 217, 218, 228; 348/169; 364/516, 526, 578

[56] References Cited

U.S. PATENT DOCUMENTS

| | | | |
|---|---|---|---|
| 5,179,421 | 1/1993 | Parker et al. | 356/152 |
| 5,245,675 | 9/1993 | Ferre et al. | 382/27 |
| 5,268,734 | 12/1993 | Parker et al. | 356/152 |
| 5,430,809 | 7/1995 | Tomitaka | 382/173 |
| 5,432,597 | 7/1995 | Parker et al. | 356/139.06 |
| 5,434,617 | 7/1995 | Bianchi | 348/170 |
| 5,465,144 | 11/1995 | Parker et al. | 356/139.06 |
| 5,471,296 | 11/1995 | Parker et al. | 356/139.06 |
| 5,473,369 | 12/1995 | Abe | 348/169 |
| 5,517,300 | 5/1996 | Parker et al. | 356/139.06 |
| 5,521,634 | 5/1996 | McGary | 348/169 |
| 5,523,783 | 6/1996 | Cho | 348/157 |
| 5,561,518 | 10/1996 | Parker et al. | 356/139.06 |
| 5,561,519 | 10/1996 | Parker et al. | 356/139.06 |
| 5,570,177 | 10/1996 | Parker et al. | 356/139.06 |
| 5,572,317 | 11/1996 | Parket et al. | 356/139.06 |
| 5,610,653 | 3/1997 | Abecassis | 348/110 |
| 5,621,825 | 4/1997 | Masaki et al. | 382/274 |
| 5,655,028 | 8/1997 | Soil et al. | 382/133 |
| 5,689,575 | 11/1997 | Sako et al. | 382/118 |
| 5,751,852 | 5/1998 | Marimont et al. | 382/180 |
| 5,754,674 | 5/1998 | Ott et al. | 382/112 |
| 5,754,688 | 5/1998 | Gatlin et al. | 382/193 |

OTHER PUBLICATIONS

Schuster, Rolf "Color Object Tracking with Adaptive Modeling", IEEE Visual Behaviors, 1994 Workshop, Mar. 1994, pp. 91–96.

Glenn Healey et al., "Using Illumination Invariant Color Histogram Descriptors for Recognition", IEEE Computer Vision and Pattern Recognition, 1994, pp. 355–360.

V.V. Vinod et al., "Focussed Color Intersection with Efficient Searching for Object Detection and Image Retrieval", IEEE Multimedia Computing and Systems, 1996 Int'l Conference, Sep. 1996, pp. 229–233.

*Primary Examiner*—Kevin J. Teska
*Assistant Examiner*—Russell W. Frejd
*Attorney, Agent, or Firm*—Wilson Sonsini Goodrich & Rosati

[57] ABSTRACT

A system and method which identifies an object in an image. The system accesses a statistical model corresponding to a statistically identifying feature of the object and accesses a characteristic corresponding to a second identifying feature of the object. The system generates a value set from the image, the statistical model, the characteristic, and a geometric relationship. The value set indicates a likely location of the object in the image. The object is located using the value set.

36 Claims, 3 Drawing Sheets

OBJECT TRACKING SYSTEM USING STATISTICAL MODELING AND GEOMETRIC RELATIONSHIP

BACKGROUND OF THE INVENTION

1. Copyright Notice

A portion of the disclosure of this patent document contains material which is subject to copyright protection. The copyright owner has no objection to the facsimile reproduction by any one of the patent disclosure, as it appears in the Patent and Trademark Office patents files or records, but otherwise reserves all copyright rights whatsoever.

2. Field of the Invention

The present invention relates to the field of image tracking; and more particularly to the use of statistical modeling in image tracking.

3. Description of Related Art

Computer vision systems help computers to track objects within images. Automatically tracking a moving object within an image is desirable. If an object is tracked, it can potentially be better viewed in a video or other camera system than without tracking. Tracking is the process of moving the field of view of a camera, or other imaging system, to follow an object.

Various methods have been tried to track objects within images. For example, geometric methods have been used. One geometric method is edge matching. In edge matching, the computer looks for a certain, known geometric arrangement of edge features of the object, for example, intensity edge contours. Edge and other types of contours may be tracked by the computer by employing shape matching algorithms, as described in "Shape Matching Using Relaxation Techniques," by Larry S. Davis in IEEE Transactions on a Pattern Analysis and Machine Intelligence, Vol. PAMI-1, No. 1. One problem with geometric methods of object tracking is that they tend to expect a rigid geometric relationship of features, which cannot be expected for objects undergoing large, complex 3D rotations, articulations, and other natural motions.

Computer vision systems may also use colors in order to track an object within an image. A technique known as color indexing may be employed to use colors to help identify an object within an image. Color indexing is described in the paper "Color Indexing," by Michael J. Swain, University of Rochester Computer Science, Technical Report 360. Swain teaches that a color histogram can be used for image tracking. A color histogram is a statistical model of the colors in an object. An object can be tracked using a color histogram by looking for parts of the image that have colors that correspond to colors in the color histogram of the object to be identified. However, prior systems using color indexing do not provide the performance desired for various tracking applications, in part because the overall color of an object is often insufficient, by itself, for distinguishing an object from others.

Prior techniques of tracking and identifying objects within images have the disadvantage of inaccuracy under certain circumstances. Thus, there is a need for an improved method of object identification and tracking within an image.

SUMMARY OF THE INVENTION

One embodiment of the invention provides a system and method which identify an object in an image using a computer system and a second image. The second image has a first set of points that aid in identifying the object and a second set of points that aid in identifying the object. The first set of points have a geometric relationship with the second set of points. A first statistical model corresponding to the first set of points is accessed and a characteristic corresponding to the second set of points is accessed. In one embodiment, a value set is generated from the first image, the statistical model, the characteristic, and the geometric relationship, and the value set indicates a likely location of the object in the first image. The object is located in the image using the value set.

In one embodiment, a step of generating the value set comprises generating at least a value indicating a correspondence between a portion of the first image and the statistical model, the characteristic, and the geometric relationship. In another embodiment, the image includes a pixel and the correspondence indicates a degree of matching between the pixel, the statistical model, and the characteristic.

Another embodiment of the invention is an object tracking system for tracking an object in a tracking image. The object tracking system comprises a camera and computer system coupled to the camera. The computer includes a statistical and geometric object identification process.

DETAILED DESCRIPTION

One embodiment of the invention provides a method and system for tracking an object, such as a person, within an image. In this embodiment, the computer first creates two statistical models of two distinct parts of the object. After creating models of the object, the computer tracks the object by using the models to look for the object in tracking images. The statistical models correspond to features of the object such as color or texture. The computer looks for portions in the tracking image corresponding to the respective models. The computer also looks for regions where the geometric relationship between the portions of the image corresponding to the models is the same geometric relationship as between the portions of the object from which the models were generated. For example, if the computer is tracking a person, the computer may create one model of the person's head and another model of the person's torso. The computer determines which portions of the tracking image correspond to the head model and which portions correspond to the torso model. Then the computer looks for areas of the tracking image where portions corresponding to the head are located at the proper distance above portions corresponding to the torso. These areas of the tracking image correspond to the location of the person on the tracking image. Based on the location of the person in the tracking image, the camera can be then controlled to track the person.

Figure 1:
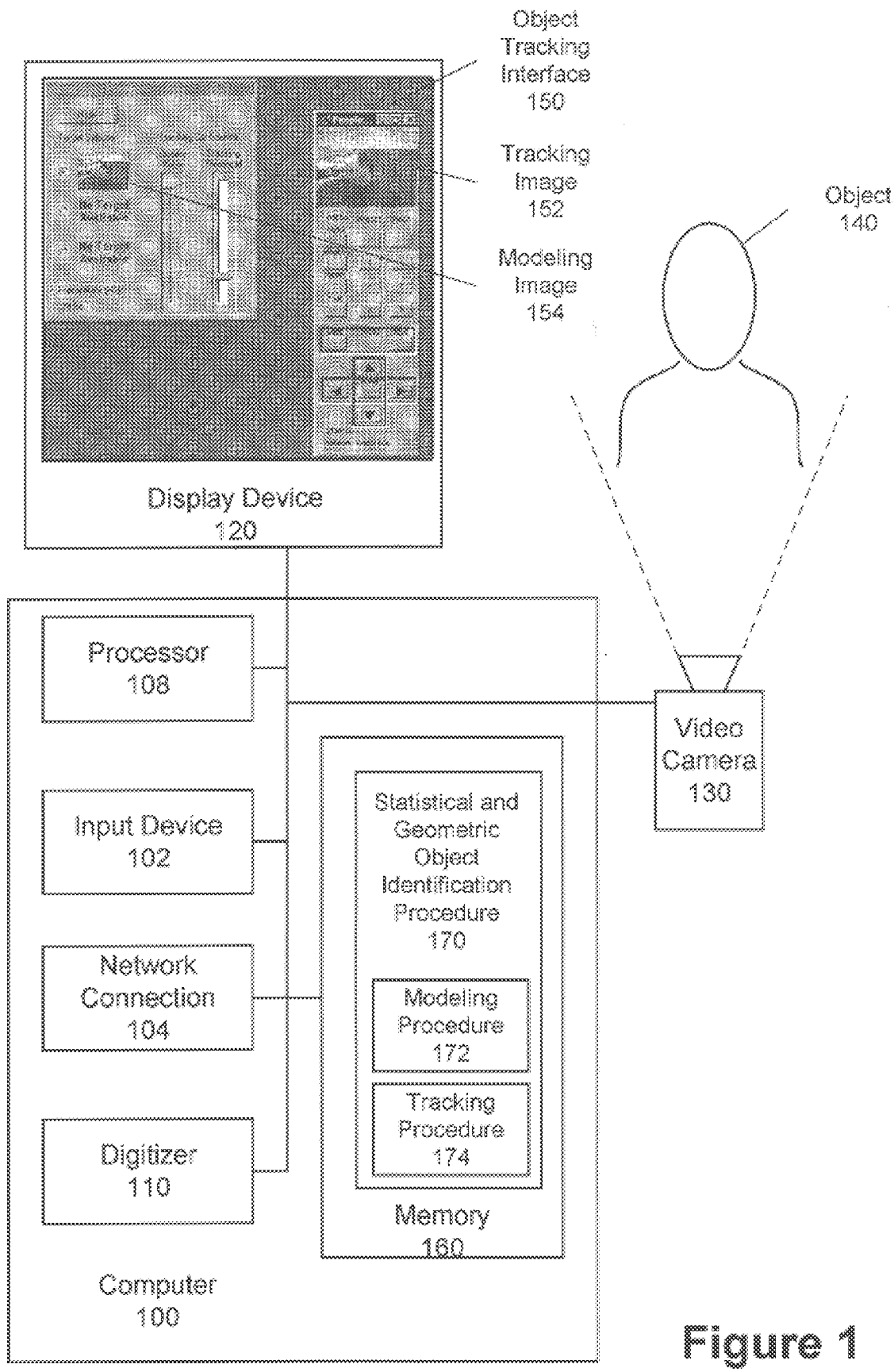
FIG. 1 shows a computer controlled video system using statistical and geometric object identification according to an embodiment of the present invention.
Figure 3:
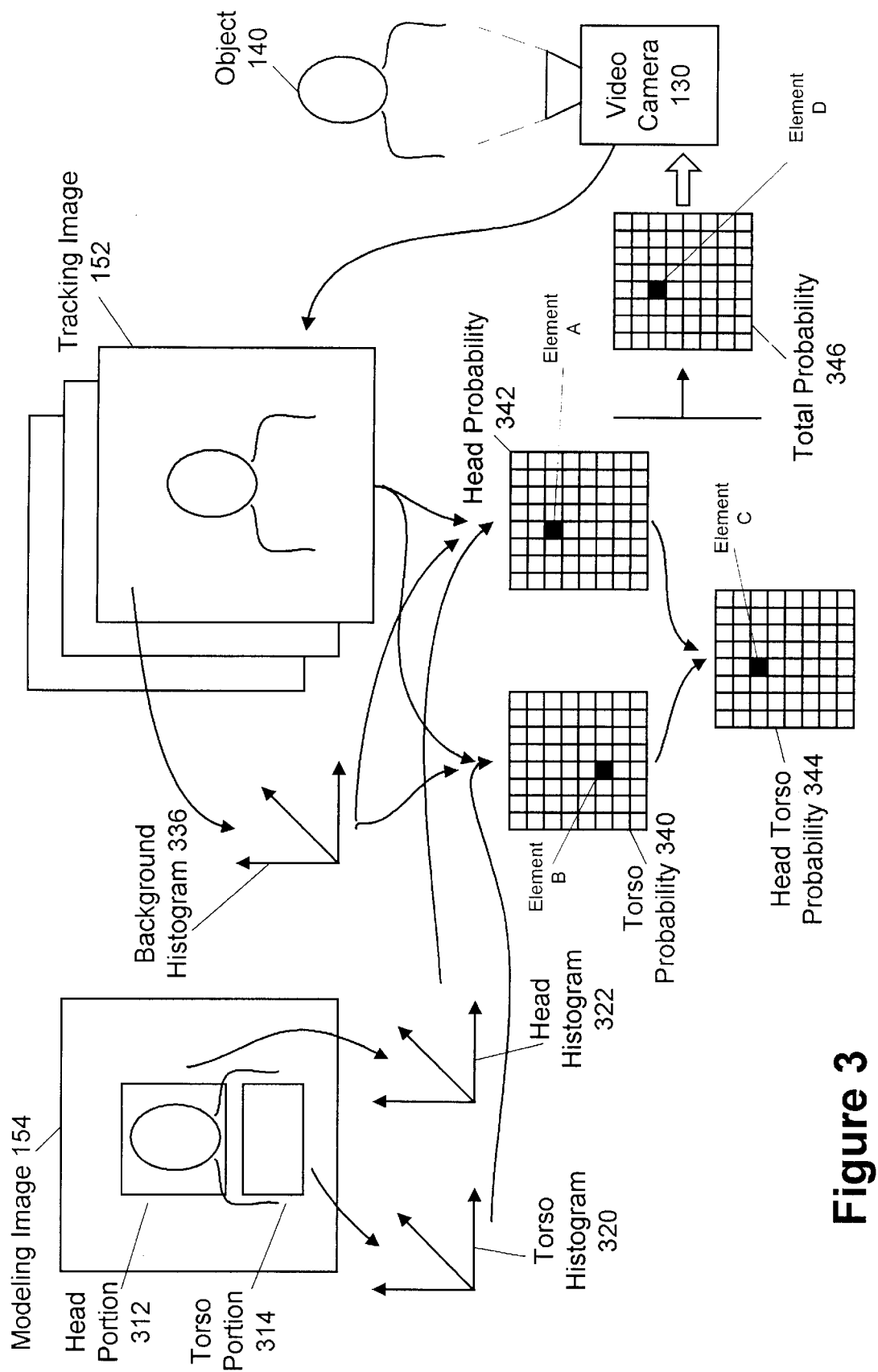
FIG. 3 shows flow of computation for statistical and geometric image tracking according to an embodiment of the present invention.

A detailed description of embodiments of the invention is provided with reference to the figures. In the description of FIGS. 1 and 3, the elements in each figure are listed first. Next, interconnections between the elements of the figure are indicated. Finally, the operation of the elements of the figure is described.

System Overview

This paragraph is a list of the elements in FIG. 1. FIG. 1 includes an object 140 which is being tracked, a video camera 130, a computer 100, and a display device 120. The computer 100 includes a processor 108, an input device 102, a network connection 104, a digitizer 110, and a memory 160. The memory 160, includes a statistical and geometric object identification procedure 170. The statistical and geometric object identification procedure 170 includes a modeling procedure 172 and a tracking procedure 174. The display device 120, includes a modeling image 154, an object tracking interface 150, and a tracking image 152 in the object tracking interface 150.

This paragraph describes the interconnections between the elements in FIG. 1. The video camera 130 receives an image from object 140. Video camera 130 is coupled to computer 100 via a bus within computer 100. Alternatively, if video camera 130 is an analog camera, it may be coupled to digitizer 110 as well as to the bus. Processor 108, input device 102, network connection 104, digitizer 110, and memory 160 are coupled to the bus within computer 100. Computer 100 is coupled to display device 120.

FIG. 1 shows a computer controlled video system using statistical and geometric object identification according to an embodiment of the present invention.

Video Camera 130 is used to obtain images from object 140. Video camera 130 is a camera that provides electrical signals corresponding to images of object 140. Video camera 130 is controlled by computer 100 and provides images to computer 100. In other embodiments video camera 130 is another image acquisition device, such as an infra-red camera or radar system, that provides electrical signals corresponding to an image of an object. In other embodiments, video camera 130 is a video cassette recorder (VCR) or connection to a network that provides images.

Computer 100 is an image processing computer. Computer 100 may be a personal computer modified for image processing, a custom manufactured computer for image processing, or may be a computer built into a display or camera system. Computer 100 is controlled by processor 108. Input device 102 allows input to computer. Input device may be a mouse, other pointing device, or keyboard that allows a user to control the system and select an object in the modeling image 154. Network connection 104 allows computer to be connected to a network. Memory 160 contains procedures which allow computer 100 to perform object tracking. Statistical and geometric object identification procedure 170 helps computer to identify and track images within a tracking image.

Modeling procedure 172 creates models of a modeling image, and tracking procedure 174 tracks objects within a tracking image using the models. The user selects a portion of the modeling image 154 from which models are created. The user may select a portion of the modeling image 154 by using a mouse pointing device to place a window over a portion of the modeling image 154. Object tracking interface 150 shows tracking image 152, which is tracked by computer 100 using statistical and geometric object identification procedure 170. In an alternative embodiment, selection of a portion of the modeling image is automated. In one embodiment where selection of a portion of the modeling image is automated, selection is based on detection of moving objects.

Statistical and Geometric Object Tracking Flow

Figure 2:
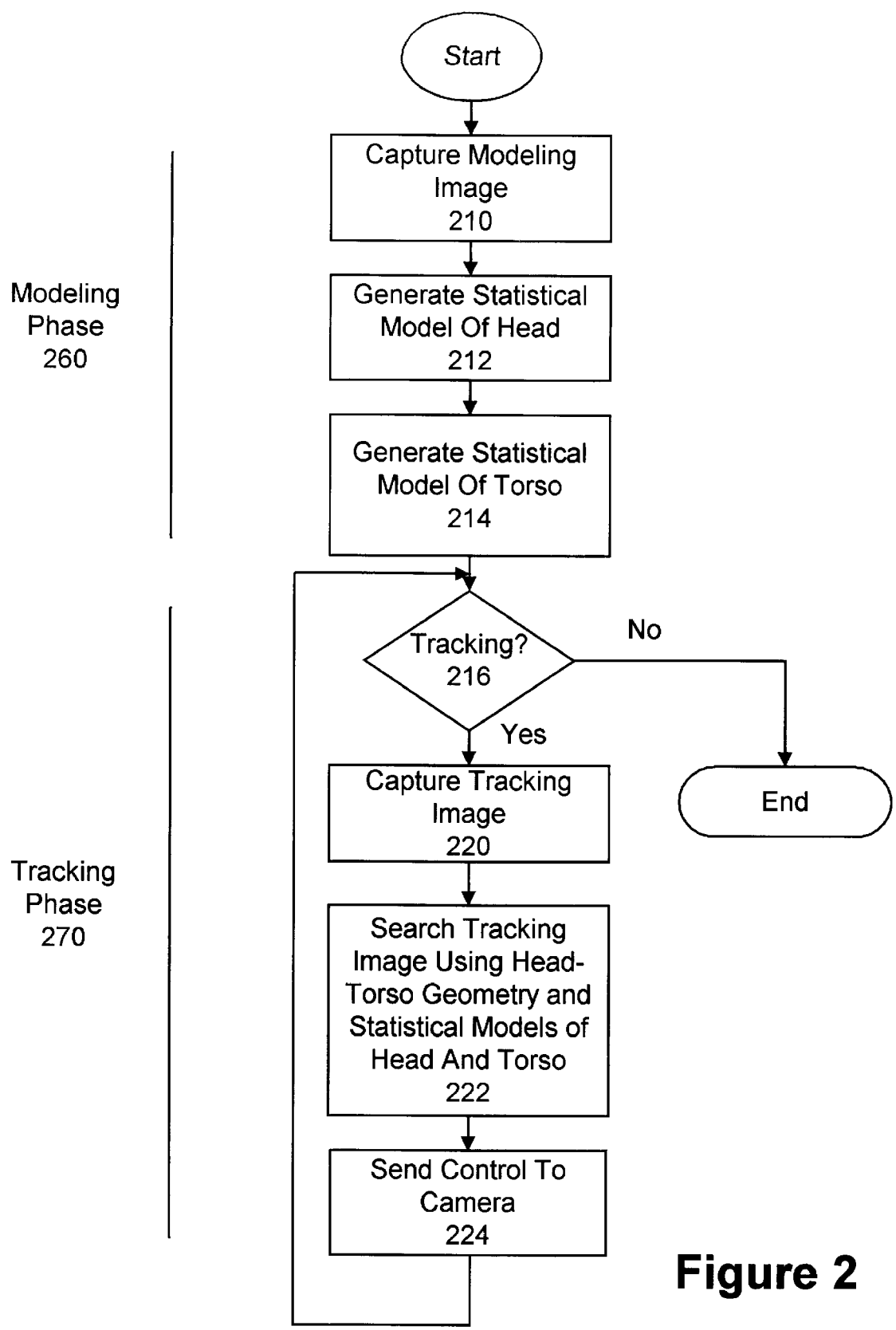
FIG. 2 shows a flow chart of statistical and geometric object tracking according to an embodiment of the present invention.

FIG. 2 shows a flow chart of statistical and geometric object tracking according to an embodiment of the present invention. FIG. 2 includes a modeling phase 260 and a tracking phase 270.

The purpose of the modeling phase 260 is to create models of the object that can be used later to locate the object 140 in the tracking image 152. In the modeling phase 260, video camera 130 captures the modeling image 154, and a user selects a region of the modeling image 154 corresponding to the object 140 to be tracked. The modeling image 154 is processed by the modeling procedure 172. The modeling image 154 is processed to create two color histograms, one of the head and one of the torso. The color histogram of the head is created from an area of the modeling image 154 corresponding to where the head is located, and the color histogram of the torso is created of an area of the modeling image offset below the head area.

The purpose of the tracking phase 270 is to track the object 140 within the tracking image 152 and to control the video camera 130 in response to the location of the object 140 within the tracking image 152. The video camera 130 captures the tracking image 152, and the tracking image 152 is processed by the computer 100. The tracking image 152 is compared to the statistical models generated in the modeling phase 260 to locate the object in the tracking image 152.

First, the modeling image 154 is captured (block 210). From the modeling image 154, a statistical model of the head is generated (block 212). In one embodiment, the statistical model of the head is a color histogram. Also from the modeling image 154 a statistical model of the torso is generated (block 214). The statistical model of the torso is a color histogram. The computer 100 checks to see whether it is in the tracking phase 270 (block 216). If the computer 100 is not in the tracking phase 270, the process will end, otherwise a tracking image 152 is captured (block 220). The tracking image 152 is searched using the statistical models of the head and the torso (block 222). The tracking image 152 is searched to find a correspondence between pixels within the tracking image 152 and the statistical models. Location is derived from the search of the tracking image 152 to find a correspondence between pixels within the tracking image 152 and the statistical models. Based on the location of the object 140 found in block 222, the computer 100 sends controls to video camera 130 (block 224). Then, computer 100 begins another cycle of tracking, returning to block 216 and continues capturing tracking images, locating the object 140 within the tracking images, and controlling the video camera 130 in response to the location of the object 140 within the tracking images 152.

FIG. 3 shows flow of computation for statistical and geometric image tracking according to an embodiment of the present invention. This paragraph lists the elements in FIG. 3. FIG. 3 includes a modeling image 154, a torso histogram 320, a head histogram 322, a tracking image 152, a torso probability 340, a head probability 342, a head torso probability 344, a total probability 346, a video camera 130, an object 140, and a background histogram 336. The modeling image 154 has a head portion 312 and a torso portion 314.

This paragraph describes the interrelation of elements in FIG. 3. The torso histogram 320 is generated from the torso portion 314. The head histogram 322 is generated from the head portion 312. The torso probability 340 is generated from the torso histogram 320, the background histogram 336, and the tracking image 152. The head probability 342 is generated from the head histogram 332, the background histogram 336, and the tracking image 152. The head torso probability 344 is generated from the torso probability 340 and the head probability 342. The total probability 346 is generated from the torso probability 340, the head probability 342, and the head torso probability 344. The total probability 346 is used in the control of video camera 130. Video camera 130 creates an image of object 140.

The following is a description of operation of an embodiment of the invention with reference to FIG. 3. Modeling image 154 is an image of the object from which models are generated. The models are generated in the modeling phase and are used to track the object in the tracking phase. A user selects an area of the modeling image 154 which corresponds to the object to be tracked. The computer then generates models of portions of the object that was selected by the user. From the head portion 312, the computer generates a head histogram 322. The head histogram 322 is a statistical model of the head portion 312 of the modeling image 154. The head histogram 322 models the colors within head portion 312. The torso histogram 320 is generated from the torso portion 314. The torso histogram 320 is a statistical model of the colors in the torso portion 314 of the modeling image 154.

The histograms are 3-dimensional and use Y U V coding. In other embodiments of the invention, other forms of coding are used, such as coding by red/blue/green. For additional information regarding creating color histograms from images please refer to "color indexing" by Michael J. Swain, University of Rochester Computer Science, Technical Report 360. In other embodiments of the invention, the histograms are statistical models of other attributes of the image, such as intensity or texture. Also, in another embodiment, instead of two histograms, one histogram is used in conjunction with a model of some other characteristics of the object, such as the object's outline or shape.

During the tracking phase, a tracking image 152 is received by the computer. This tracking image 152 is searched in order to track the object within the tracking image 152. A series of probability matrices are generated from the tracking image and the histograms. The probability matrices represent probabilities, or likelihoods, that the object is present at various locations within the tracking image 152.

Head probability 342 is a matrix that is generated from tracking image 152 and head histogram 322. Head histogram 322 is first normalized with respect to the background of the tracking image 152 in order to take into account saliency of head values relative to background values. Background histogram 336 is a color histogram generated from tracking image 152. Head histogram 322 is normalized by dividing it by background histogram 336. The normalized head histogram 322 is then combined with tracking image 152 to generate head probability 342. Head probability 342 is a matrix with a series of values, where the values indicate a likelihood that the object is at any particular location within the tracking image 152.

Torso probability 340 is also a matrix and is similarly generated from torso histogram 320, background histogram 336, and tracking image 152.

Head torso probability 344 is also a matrix with values indicating likelihood that the object exists at any particular location within tracking image 152. Head torso probability 344 is generated in response to values in torso probability 340 and head probability 342 and the geometric relationship between those values. A value in head torso probability 344 indicates that there is a probability of location of the head portion within the proper geometric relationship, an offset, of the torso.

In alternative embodiments, the geometric relationship includes relationships other than a fixed vertical offset. For example, in one embodiment, the geometric relationship is a dynamically adjusted offset that accounts for camera zooming or movement of the object. In another embodiment, the geometric relationship is a horizontal offset. In another embodiment, the geometric relationship is a distance between different regions of the object. In another embodiment, the geometric relationship is non-linear. In one embodiment, the geometric relationship is the location of regions of the object on a dynamically adjusted curve.

Total probability 346 is a matrix indicating likely locations of the object. Total probability 346 is generated as a weighted combination of head probability 342, torso probability 340, and head torso probability 344. Total probability 340 is searched to determine likely location of object 140. Based on likely location of the object 140, controls are generated to control the position of video camera 130. Thus, video camera 130 is controlled based on total probability 346 to track object 140 and to provide further tracking images 152.

The following is an example of a partial calculation of the matrices shown in FIG. 3. In this example a probability scale of 0 through 16 is used, where 0 is the lowest probability and 16 is the highest probability, for the head probability 342, the torso probability 340, and the head torso probability 344. An offset of 3 elements in the matrix is chosen as the geometric relationship. Exemplary element A, of head probability 342, may have a value of 16, and exemplary element B, of torso probability 340, may have a value of 16. Exemplary element C, of head torso probability 344, is generated from exemplary element A and exemplary element B. In this example, exemplary element C has a value of 16. Exemplary element D is generated from exemplary elements A, B, and C and has a value of 10. Other elements of the matrices are generated similarly.

Table 1 shows pseudocode for one embodiment of the invention. The pseudocode includes modeling phase 260 and tracking phase 270. In modeling phase 260 models are generated from portions of the object 140. In this example, head and torso probability values are generated pixel by pixel in the tracking image 152. A pixel in the tracking image 152 is quantized to yield a number representing the color of the pixel. That number, color val, is used to index into the respective histogram to determine the population of that color in the histogram. The head probability for a pixel is then equal to that population value from the head histogram over the background value. Thus the variable pixel is used to index into the head probability matrix in order to assign a probability that corresponds to the pixel represented by the variable pixel. The head torso probability is calculated for each pixel in the tracking image. An offset is added to the pixel location in order to find a pixel that would correspond to the torso. A total probability is generated for each pixel by combining weighted values of head probability, torso probability, and head torso probability.

TABLE 1

Pseudocode

```
/* modeling phase */
    select portion of image corresponding to head
    generate head histogram
    select portion of image at an offset from head portion.
    generate torso histogram
/* tracking phase */
for each tracking image
    /* normalize against background */
    normalized head histogram    =    (head histogram) / (background histogram)
    normalized torso histogram   =    (torso histogram) / (background histogram)
    /* generate head and torso probability values */
    for each pixel in tracking image
        quantize pixel color to yield color val
        head probability [pixel]   =    head histogram [color val]
        torso probability [pixel]  =    torso histogram [color val]
    /* generate combined head/torso probability */
    for each pixel in the tracking image
        /* torso pixel is located by adding offset to pixel */
        if color at [pixel + offset] = one of three most common torso colors then
            head torso probability = head probability [pixel]
        else
            head torso probability = 0
    /* generate total probability */
    for each pixel
        total_probability [pixel] = head probability [pixel]/4
        + torso probability [pixel + offset]/8
        + head torso probability [pixel]/4
    object location = portion of image
        corresponding to where total probability has highest probability levels.
    send controls to camera based on object location
```

Additional Embodiments

The pseudocode shows only one embodiment of the invention. In an embodiment of the invention, the probabilities are weighted more heavily if they correspond to pixels near where the object was found in prior frames. In other embodiments of the invention, other weights are used in order to combine the probabilities to create a total probability, so as to give greater weight to the head probability, the torso probability, the head torso probability, or some combination of those probabilities. Offset is a fixed value of $3/2$ of the size of the head portion and represents a vertical offset. In other embodiments of the invention Offset could is set to other values and represents other types of geometric relationships other than a vertical displacement. In another embodiment Offset is adjusted dynamically to account for camera zooming or movement. In another embodiment Offset is adjusted dynamically to account for other changing geometric relationships between portions of the modeling image.

An alternative embodiment of the invention is a video teleconferencing system. One embodiment of the invention is a video teleconferencing system that tracks the image of a person or other objects. An embodiment of the invention is a system in MTEG applications to track objects within images. Another embodiment of the invention is a television or broadcasting system that allows users to track a particular object within an image. For example one embodiment a person watching television can select an object within the television screen and the system tracks that object as it moves around the screen. An embodiment of the invention provides continued tracking of an object during zooming of a camera. An embodiment of the invention reduces camera jitter by tracking on an object within an image.

The invention also has applications in security. For example, an embodiment of the invention in a scanning system or computer vision system the invention tracks or detects a object that has been previously identified. The invention is not limited to the use of images that are normally viewed by humans. For example, embodiments of the invention include scanning or tracking systems based on images generated from X-rays, infra-red scanning, ultrasound, radar, or magnetic imaging.

Accordingly, a method and system are provided for tracking an object, such as a person, within an image. The computer creates statistical models of the object to be tracked. After locating the models of the object, the computer tracks the object by using the models and geometric relationships between the models. The computer uses the models in combination to provide enhanced tracking of the object.

What is claimed is:

1. A method of identifying an object in a first image using a computer and a second image, the second image having a first set of points that aid in identifying the object and a second set of points that aid in identifying the object, the first set of points having a geometric relationship with the second set of points, the method comprising the steps of:

accessing a statistical model corresponding to the first set of points;

accessing a characteristic corresponding to the second set of points;

generating a value set from the first image, the statistical model, the characteristic, and the geometric relationship, the value set indicating a likely location of the object in the first image; and locating the object in the first image using the value set.

2. The method of claim 1 wherein the step of generating the value set comprises generating at least a value indicating a correspondence between a portion of the first image and the statistical model, the characteristic, and the geometric relationship.

3. The method of claim 2 wherein the portion of the first image includes a pixel, and wherein the correspondence indicates a degree of matching between the pixel, the statistical model, and the characteristic.

4. The method of claim 1 wherein the statistical model includes a histogram of the first set of points.

5. The method of claim 4 wherein the characteristic includes a second histogram of the second set of points.

6. The method of claim 5 wherein the first set of points corresponds to a first region of the second image, the second set of points corresponds to a second region of the second image, and the geometric relationship corresponds to a predetermined distance between the first region and the second region.

7. The method of claim 6 wherein the second image comprises a plurality of pixels and wherein the predetermined distance corresponds to an offset in pixels between the first region and the second region.

8. The method of claim 5 wherein the histogram and the second histogram are color histograms.

9. The method of claim 5 further comprising the steps of:
generating a third histogram of the first image; and
prior to generating the value set, normalizing the histogram and the second histogram using the third histogram.

10. A method of identifying an object in a first image, the method comprising the steps of:
accessing a second image, the second image including a third image identifying the object;
generating a first model from the third image; the first model corresponding to a first statistical analysis of a first part of the third image;
generating a second model from the third image, the second model corresponding to a characteristic of a second part of the third image, the second part having a geometric relationship with the first part;
accessing the first image;
generating a value set from the first image, the first model, the second model, and the geometric relationship, the value set indicating a likely location of the object in the first image; and
using the value set to identify the object in the first image.

11. The method of claim 10 wherein the step of generating the value set comprises generating a value indicating a correlation between the first image and the first model, the second model, and the geometric relationship.

12. The method of claim 11 wherein generating the first model includes generating a first histogram of the first part, wherein generating the second model includes generating a second histogram of the second part, and the method further comprises:
generating a third histogram of the first image; and
prior to generating the value set, normalizing the first histogram and the second histogram using the third histogram.

13. The method of claim 12 wherein the normalizing the first histogram and the second histogram includes dividing the first histogram by the third histogram, and dividing the second histogram by the third histogram.

14. The method of claim 12 wherein the first image includes a plurality of color values, the first model includes a first histogram of the first part, the second model includes a second histogram of the second part, and generating the value indicating the correlation between the first part, the second part, the first model and the second model includes:

accessing a first color value at a first location in the first image, the first color value having a first correspondence to the first histogram;
accessing a second color value at a second location in the first image, the second color value having a second correspondence to the second histogram, the second location having a second geometric relationship with the first location, the second geometric relationship corresponding to the geometric relationship;
determining a third correspondence between the first color value and the second color value using the first histogram and the second histogram; and
determining the value from the first correspondence, the second correspondence, and the third correspondence.

15. The method of claim 10 wherein the object is a human, wherein the first part corresponds to the head of the human, and wherein the second part corresponds to the torso of the human.

16. The method of claim 10 further comprising the step of using a mouse pointing device to define the first part with a window.

17. The method of claim 10 wherein the accessing the second image includes receiving a the image from a video camera.

18. The method of claim 17 wherein the accessing the second image includes receiving the second image from a network.

19. The method of claim 17 wherein the accessing the second image includes extracting the second image from a digital movie.

20. A method of determining a likely location of an object in an first image, the method comprising the steps of:
receiving a modeling image, the modeling image including an image of the object;
generating a first color histogram from the modeling image, the first color histogram corresponding to a first region of the object, the first region also corresponding to the image of the object;
generating a second color histogram from the modeling image, the second color histogram corresponding to a second region of the object;
receiving the first image; and
generating a value set from the first image, the first color histogram, the second color histogram, and a geometric relationship between the first region and the second region, the value set having values indicating a likely location of the object in the first image.

21. The method of claim 20, wherein the step of generating the value set comprises generating at least one value indicating a first relationship between a first portion of the first image and the first color histogram, the one value also indicating a second relationship between a second portion of the first image and the second color histogram.

22. The method of claim 21 wherein the geometric relationship comprises an offset between the first region of the object and the second region of the object.

23. The method of claim 22, wherein the first portion of the first image has a first color, second portion of the first image has a second color and the step of generating as least one value further comprises:
selecting a first population value from the first color histogram, the first population value corresponding to the first color;
selecting a second population value from the second color histogram, the second population value corresponding to the second color; and determining a relationship between the first population value and the second population value;

using the relationship to generate the one value.

24. The method of claim 21, wherein the first portion of the first image comprises a pixel.

25. The method of claim 21, wherein the first portion of the first image has a first color and the step of generating at least one value comprises:

selecting a first population value from the first color histogram, the first population value corresponding to the first color; and using the first population value to generate the at least one value.

26. The method of claim 20, wherein the step of generating the first color histogram comprises the step of measuring hue and saturation values of the modeling image.

27. The method of claim 26, wherein the step of generating the first color histogram further comprises the step of measuring luminance values of the modeling image.

28. The method of claim 20, wherein the step of generating the first color histogram further comprises the step of measuring red, blue, and green values of the modeling image.

29. The method of claim 20, wherein the step of generating the first color histogram further comprises the step of determining a count of each occurrence of a color value of a set of colors.

30. An object tracking system for tracking an object in a tracking image, the object tracking system comprising:

a camera; and a computer system coupled to the camera, the computer system having a memory, a processor, and an object identification procedure, the object identification procedure including, a modeling procedure that generates a first statistical model of a first region of the object and a second statistical model of a second region of the object based on a modeling image, the first region having a first geometric relationship with the second region, and a tracking procedure that locates the object at a location in the tracking image and generates a set of camera controls for the camera responsive to determining the location, the location having a first portion of the tracking image corresponding to the first statistical model and having a second portion of the tracking image corresponding to the second statistical model, wherein the first portion has a second geometric relationship with the second portion, the second geometric relationship corresponding to the first geometric relationship.

31. The object tracking system of claim 30, further comprising a camera control procedure that uses the set of camera controls to control the camera in response to the object identification procedure.

32. The object tracking system of claim 30, wherein the first portion comprises a plurality of pixels.

33. The object tracking system of claim 30, wherein the first statistical model comprises a color histogram.

34. The object tracking system of claim 30, wherein the first statistical model comprises a texture histogram.

35. The object tracking system of claim 30, wherein the first statistical model comprises a intensity histogram.

36. The object tracking system of claim 30, wherein the modeling procedure generates second models of a second object and wherein the tracking procedure locates the second object at a second location in the tracking image using the second models.

* * * * *